United States Patent [11] 3,576,308

[72] Inventor Arthur D. Baker, Jr.
    1023 W. Baetz Blvd., San Antonio, Tex. 78221
[21] Appl. No. 790,657
[22] Filed Jan. 13, 1969
[45] Patented Apr. 27, 1971

[54] TRUCK MIRROR AND MOUNT
    2 Claims, 4 Drawing Figs.
[52] U.S. Cl. .................................................... 248/476
[51] Int. Cl. .................................................... A47g 1/24
[50] Field of Search .......................................... 248/480,
    495, 494, 487, 298, 286, 287, 489; 248/476

[56] References Cited
UNITED STATES PATENTS
3,372,897  3/1968  Lee ............................ 248/480
3,384,334  5/1968  Malachowski ............... 248/487

Primary Examiner—Edward C. Allen
Attorney—John C. Stahl

ABSTRACT: A mirror device for trucks giving a clear and unobstructed view to the driver. This mirror has an arcuate and tubular frame which is horizontally secured to the truck's door by a pair of brackets and an auxiliary support bracket. The mirror is suspended within the arcuate frame and is adjustable up and down as well as angularly.

PATENTED APR 27 1971 3,576,308

INVENTOR.
Arthur D. Baker, Jr.

TRUCK MIRROR AND MOUNT

This invention relates to adjustable mirrors, and more particularly to a truck mirror and mount.

It is therefore the main purpose of this invention to provide a truck mirror and mount which is of such construction so as to provide a maximum of safety for the truckdriver.

Another object of this invention is to provide a truck mirror and mount which when properly adjusted will provide a clear, unobstructed view of the rear and will not block the driver's side view, particularly at intersections.

A further object of this invention is to provide a mirror and mount of the described type which will be adjustable crosswise at an angle lengthwise and which will provide an extremely better rear view than those structures of the prior art.

Other objects of this invention are to provide a truck mirror and mount which is simple in design, inexpensive to manufacture, rugged in construction, easy to use and efficient in operation.

These and other objects will become readily apparent upon a study of the following specification together with the accompanying drawing wherein.

Figure 1:
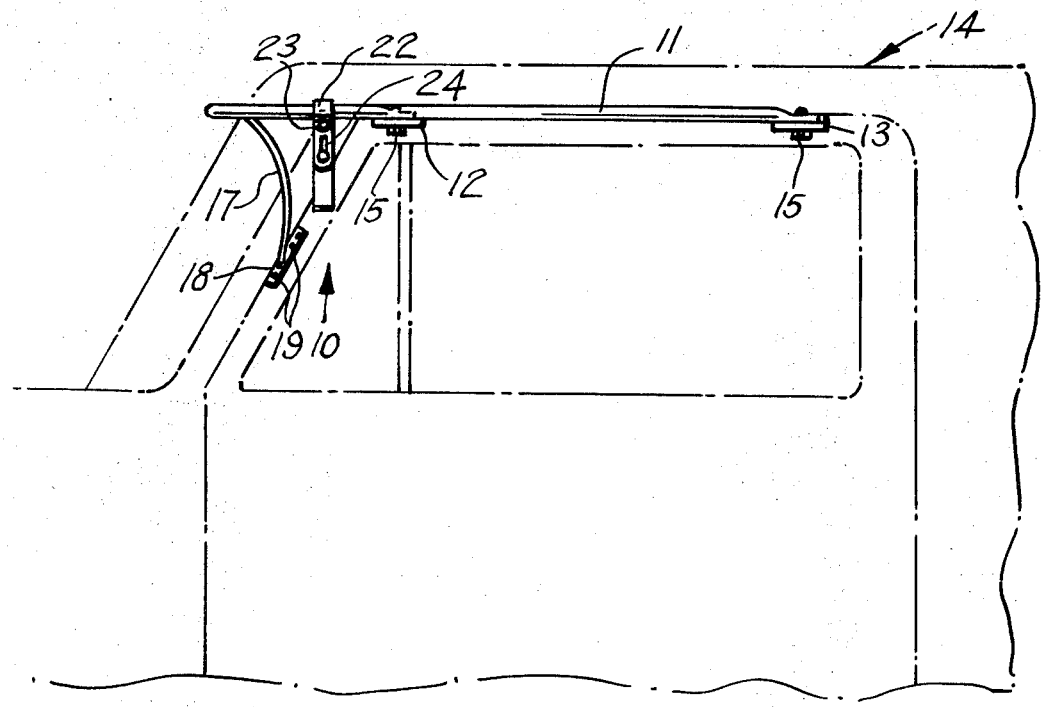
FIG. 1 is a side view of the present invention shown secured to a truck cab door which is shown in phantom lines.
Figure 2:
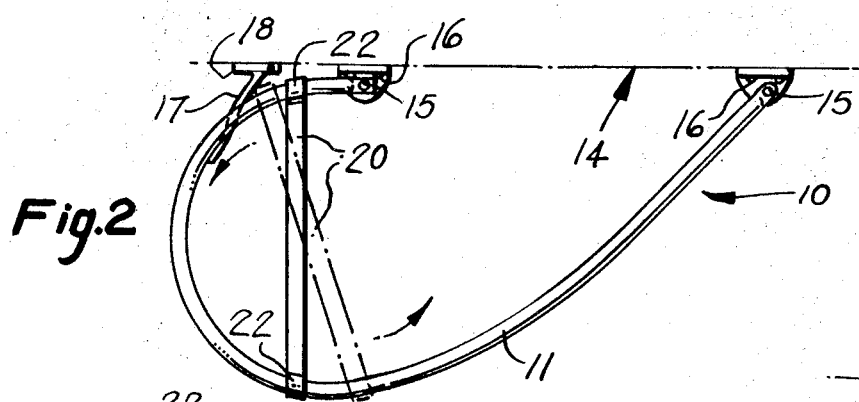
FIG. 2 is a top plan view of the present invention showing one mirror positioned in phantom lines.
Figure 3:
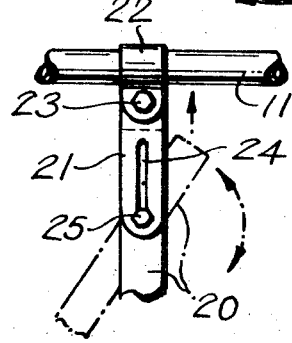
FIG. 3 is an enlarged fragmentary view of FIG. 1 showing a mirror positioned in phantom lines.
Figure 4:
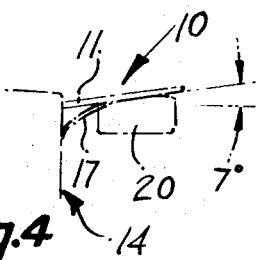
FIG. 4 is a diagrammatic rear view of the mirror and mount.

According to this invention, a truck mirror and mount 10 is shown to include a partially teardrop-shaped configuration frame 11 which comprises a segment of a circle and may be tubular or solid in cross section. Frame 11 is generally horizontal and tilted slightly upwards to provide for maximum visibility and is secured at each end to L-shaped brackets 12 and 13. Brackets 12 and 13 are secured to the upper portion of truck door 14 and frame 11 is secured to brackets 12 and 13 by means of fasteners 15.

It will be noted that brackets 12 and 13 are secured to truck door 14 by means of suitable fasteners 16 and an arcuately shaped support bracket 17 is fixedly secured to one end within the forward end of frame 11 and the flanged portion 18 of support bracket 17 is secured to truck door 14 by means of a plurality of suitable fasteners 19. A rectangularly configurated mirror 20 is provided with a pair of side brackets 21 having a collar portion 22 which slidably receives frame 11. The collar portions 22 of brackets 21 are secured by means of bolts 23 when mirror 20 is set in a desired position with respect to frame 11. An elongated vertical slot 24 through brackets 21 allows for bolts 25 to be carried. The bolts 25 provide the elevational adjustment of mirror 20 and also the angular position of mirror 20 with respect to self-supporting brackets 21.

In use, mirror 20 of truck mirror and mount 10 is adjustable with respect to frame 11 by sliding it with the use of brackets 21 along the frame 11 until a desired position is effected, whereupon the bolts 23 may be tightened in order to render mirror 20 stationary. The mirror 20 is also adjustable within the brackets 21 to any desired angular and elevational position and is secured in a stationary position by means of the bolts 25 within the slots 24.

I claim:

1. A mirror mountable on a vehicle door comprising an essentially horizontally extending frame consisting of first and second ends and an intermediate portion comprising a segment of a circle, spaced first and second brackets secured to said vehicle door, said first and second ends of said frame secured respectively to said first and second brackets, first and second side brackets diametrically positioned on said frame, means securing said first and second side brackets on said frame, a mirror suspended within and depending from said frame, said mirror including horizontally outwardly extending studs, said first and second side brackets each including at least a vertically extending portion, an elongated slot in each of said vertically extending portions, said studs passed respectively through said slots, fastening means on said studs outwardly of said respective side brackets to adjustably secure said mirror vertically and angularly.

2. The invention of claim 1 including a support bracket including first and second ends, said first end secured to said frame intermediate said first and second ends of said frame, said second end secured to said vehicle door.